(12) United States Patent
Ishigaki et al.

(10) Patent No.: US 8,835,767 B2
(45) Date of Patent: Sep. 16, 2014

(54) SUSPENSION BOARD WITH CIRCUIT

(75) Inventors: Saori Ishigaki, Osaka (JP); Hitoki Kanagawa, Osaka (JP); Yoshito Fujimura, Osaka (JP)

(73) Assignee: Nitto Denko Corporation, Osaka (JP)

( * ) Notice: Subject to any disclaimer, the term of this patent is extended or adjusted under 35 U.S.C. 154(b) by 154 days.

(21) Appl. No.: 13/360,224

(22) Filed: Jan. 27, 2012

(65) Prior Publication Data

US 2012/0193127 A1 Aug. 2, 2012

Related U.S. Application Data

(60) Provisional application No. 61/457,257, filed on Feb. 11, 2011.

(30) Foreign Application Priority Data

Feb. 1, 2011 (JP) .................................. 2011-19984

(51) Int. Cl.
*H05K 1/00* (2006.01)
*G11B 5/48* (2006.01)

(52) U.S. Cl.
CPC .............. *G11B 5/4846* (2013.01); *G11B 5/486* (2013.01); *G11B 5/4853* (2013.01)
USPC .......................................... 174/254; 174/255

(58) Field of Classification Search
CPC ..... H05K 1/0393; H05K 1/118; H05K 1/028; H05K 3/28; H05K 3/281; H05K 1/189; H05K 2201/2009; H05K 3/0058; H05K 1/147; H05K 1/506; H05K 1/056; G11B 5/486; G11B 5/484; G11B 5/4853; G11B 5/4833; G11B 5/8404; G11B 5/4846

See application file for complete search history.

(56) References Cited

U.S. PATENT DOCUMENTS

| 6,388,201 | B2 * | 5/2002 | Yamato et al. ................. 174/255 |
| 7,142,395 | B2 * | 11/2006 | Swanson et al. ........... 360/245.9 |
| 7,388,733 | B2 * | 6/2008 | Swanson et al. ........... 360/245.9 |
| 2006/0118330 | A1 | 6/2006 | Ooyabu et al. |
| 2009/0116150 | A1 | 5/2009 | Ohsawa et al. |
| 2009/0151994 | A1 * | 6/2009 | Ohsawa et al. ............... 174/261 |

FOREIGN PATENT DOCUMENTS

| JP | 2006-165268 A | 6/2006 |
| JP | 2009-116969 A | 5/2009 |

* cited by examiner

*Primary Examiner* — Ishwarbhai B Patel
(74) *Attorney, Agent, or Firm* — Jean C. Edwards; Edwards Neils PLLC

(57) ABSTRACT

A suspension board with circuit includes an insulating base layer and a conductive pattern that is laminated on a top surface of the insulating base layer. The conductive pattern includes a wire and a terminal portion that is connected to the wire for being joined by a melted metal. The insulating base layer, in a projected surface when projected in a laminating direction, includes an adjacent region that is adjacent to the terminal portion and a separated region that is separated from the terminal portion so as to sandwich the adjacent region with the terminal portion. The adjacent region is formed to be thinner than the separated region.

11 Claims, 12 Drawing Sheets

(a)

(b)

(c)

(d)

(e)

(f)

(g)

(a)

(b)

SUSPENSION BOARD WITH CIRCUIT

CROSS-REFERENCE TO RELATED APPLICATION

The present application claims the benefit of U.S. Provisional Application No. 61/457,257 filed on Feb. 11, 2011, and claims priority from Japanese Patent Application No. 2011-19984 filed on Feb. 1, 2011, the contents of which are hereby incorporated by reference into this application.

BACKGROUND OF THE INVENTION

1. Field of the Invention

The present invention relates to a suspension board with circuit, to be specific, to a suspension board with circuit that is used in a hard disk drive.

2. Description of Related Art

Conventionally, it has been widely known that a suspension board with circuit is used in a hard disk drive. The suspension board with circuit includes a suspension and a conductive pattern that is formed thereon having a head-side terminal portion so as to be connected to a magnetic head and an external-side terminal portion so as to be connected to an external board. The suspension board with circuit is mounted on the hard disk drive by allowing the magnetic head to be mounted on the suspension, for connecting the magnetic head to the head-side terminal portion and connecting a connecting terminal of the external board to the external-side terminal portion.

To be more specific, there has been proposed that, for example, in a suspension board with circuit including a metal supporting board, an insulating layer made of polyimide and the like formed on the metal supporting board, and a conductive pattern formed on the insulating layer including a magnetic-head-side connecting terminal portion and an external-side connecting terminal portion, the magnetic head is electrically connected to the magnetic-head-side connecting terminal portion by allowing a solder ball to be disposed between the magnetic head and the magnetic-head-side connecting terminal portion to be melted and solidified (ref: for example, Japanese Unexamined Patent Publication No. 2009-116969).

In the suspension board with circuit, the connecting terminal of the external board can be connected to the external-side connecting terminal portion by allowing the solder ball to be melted and solidified in the same manner as in the connection of the magnetic head to the magnetic-head-side connecting terminal portion.

SUMMARY OF THE INVENTION

As described above, in recent years, heating and the like by laser irradiation has been considered as a method for melting the solder ball and the like.

However, in a terminal portion, when a metal is heated and melted with a high energy density including a case where laser light is applied to the metal such as the solder ball, a disadvantage may occur, such as that an insulating layer is burned around the terminal portion, so that the connecting reliability between the terminals may be reduced.

Above all, when the insulating layer is formed of a dark colored resin such as an aromatic polyimide, there is a disadvantage that the insulating layer easily absorbs a lot of energy, so that a burn is more likely to occur because of low permeability of the laser light in the insulating layer.

It is an object of the present invention to provide a suspension board with circuit that is capable of preventing a burn and connecting a terminal with excellent reliability when the terminal is connected by a metal that is heated and melted with a high energy density by a laser and the like.

A suspension board with circuit of the present invention includes an insulating base layer and a conductive pattern that is laminated on a top surface of the insulating base layer, wherein the conductive pattern includes a wire and a terminal portion that is connected to the wire for being joined by a melted metal, and the insulating base layer, in a projected surface when projected in a laminating direction, includes an adjacent region that is adjacent to the terminal portion and a separated region that is separated from the terminal portion so as to sandwich the adjacent region with the terminal portion, wherein the adjacent region is formed to be thinner than the separated region.

In the suspension board with circuit, in the projected surface when projected in the laminating direction, the insulating base layer in the adjacent region that is adjacent to the terminal portion is formed to be thinner than the insulating base layer in the separated region that is separated from the terminal portion so as to sandwich the adjacent region with the terminal portion. Therefore, the insulating base layer in the adjacent region is relatively difficult to store heat compared to the insulating base layer in the separated region. As a result, when the terminal portion is connected by a metal that is heated and melted with a high energy density by a laser and the like, a burn in the insulating base layer is prevented, so that the terminal portion can be connected with the excellent reliability.

In the suspension board with circuit of the present invention, it is preferable that the suspension board with circuit further includes a metal supporting board that supports the insulating base layer and an opening is formed, at least in a portion corresponding to the adjacent region, in the metal supporting board.

In the suspension board with circuit, excellent mechanical strength is ensured by the metal supporting board and the adjacent region and the terminal portion are exposed by the opening, so that efficient heat dissipation is ensured. Therefore, the burn can further be prevented.

In the suspension board with circuit of the present invention, it is preferable that the suspension board with circuit further includes an insulating cover layer that covers the conductive pattern.

In the suspension board with circuit, the conductive pattern is covered by the insulating cover layer, so that the conductive pattern can be protected.

In the suspension board with circuit of the present invention, it is preferable that an opening that exposes the terminal portion is formed in the insulating cover layer.

In the suspension board with circuit, the terminal portion is exposed from the opening in the insulating cover layer, so that the efficient heat dissipation is ensured. Therefore, the burn can further be prevented.

In the suspension board with circuit of the present invention, it is preferable that in the projected surface when projected in the laminating direction, the adjacent region protrudes from the conductive pattern.

In the suspension board with circuit, the adjacent region protrudes from the conductive pattern, so that the insulating layer and the like are laminated on the top surface of the adjacent region and therefore, adhesion between the layers can be improved.

In the suspension board with circuit of the present invention, it is preferable that the insulating base layer includes, on a back surface of the terminal portion, a thick layer portion that is thicker than the adjacent region, and a reinforcing layer is laminated on the back surface of the thick layer portion.

In the suspension board with circuit, the thick layer portion and the reinforcing layer are laminated on the back surface of the terminal portion, so that the excellent mechanical strength of the terminal portion can be ensured.

In the suspension board with circuit of the present invention, it is preferable that the conductive pattern includes a plurality of the terminal portions and the adjacent region is independently provided in each of a plurality of the terminal portions.

In the suspension board with circuit, the adjacent region is independently provided in each of a plurality of the terminal portions, so that the separated region is formed between the terminal portions and therefore, the excellent mechanical strength between the terminal portions can be ensured by the separated region.

In the suspension board with circuit of the present invention, it is preferable that the opening in the metal supporting board is independently provided in the portion corresponding to the adjacent region.

In the suspension board with circuit, the opening in the metal supporting board is independently provided in each of a plurality of the terminal portions, so that the metal supporting board is disposed between the terminal portions and therefore, the excellent mechanical strength between the terminal portions can be ensured by the metal supporting board.

In the suspension board with circuit of the present invention, it is preferable that the conductive pattern includes a plurality of the terminal portions and the adjacent region is provided so as to be continuous to the terminal portions that are adjacent to each other.

In the suspension board with circuit, the adjacent region is provided so as to be continuous to the terminal portions that are adjacent to each other, so that the heat dissipation is ensured in the large adjacent region and therefore, the burn can be prevented further reliably.

In the suspension board with circuit of the present invention, it is preferable that the opening in the metal supporting board is provided so as to be continuous in the portion corresponding to the adjacent region.

In the suspension board with circuit, the excellent mechanical strength can be ensured by the metal supporting board and the opening in the metal supporting board is provided so as to be continuous to the terminal portions that are adjacent to each other, so that the heat dissipation is ensured in the large adjacent region and therefore, the burn can be prevented further reliably.

In the suspension board with circuit of the present invention, it is preferable that the terminal portion includes a cut-out portion into which the melted metal enters.

In the suspension board with circuit, the melted metal enters into the cut-out portion in the terminal portion, so that the melted metal is fixed to the terminal portion further reliably and therefore, the terminal can be connected with the excellent reliability.

Figure 1:
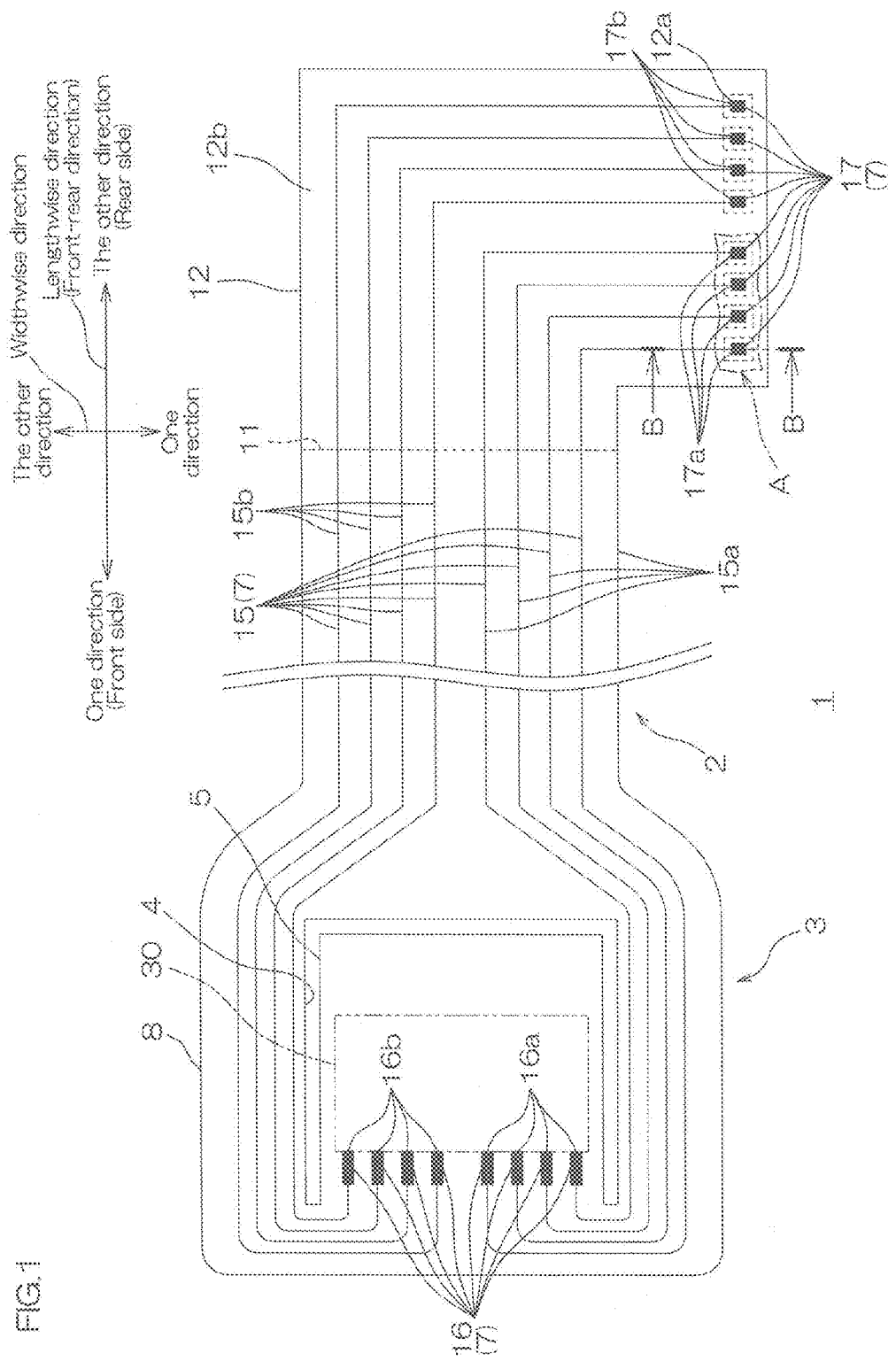
FIG. 1 shows a plan view of one embodiment of a suspension board with circuit of the present invention.

(a) illustrating an enlarged bottom view of a region A of an external-side terminal portion of the suspension board with circuit shown in FIG. 1, (b) illustrating an enlarged sectional view, taken along the line B-B of the suspension board with circuit shown in FIG. 1, and (c) illustrating an enlarged sectional view, taken along the line B-B, showing a connecting state of the suspension board with circuit shown in FIG. 1 with an external circuit board.

Figure 3:
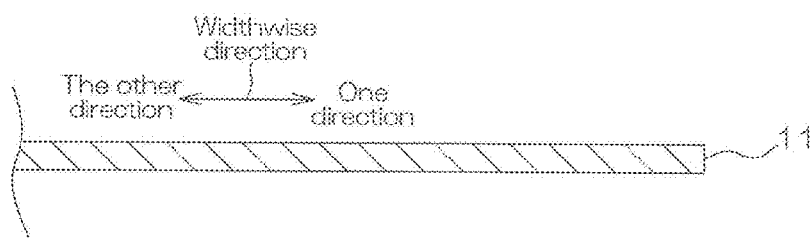
Figure 3:
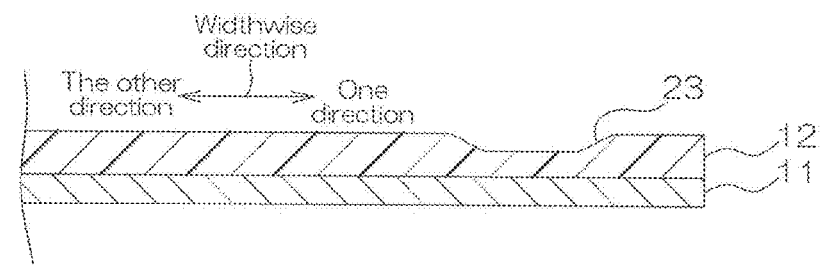
Figure 3:
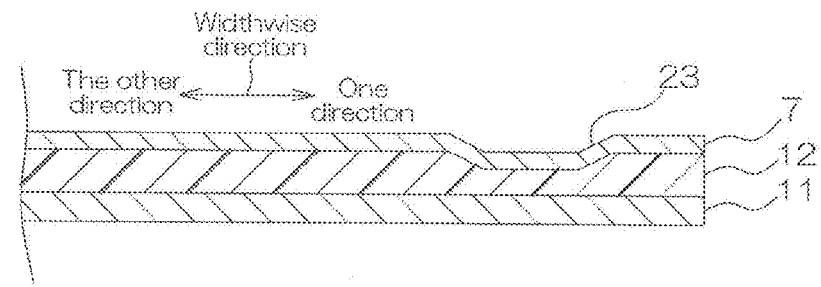
Figure 3:
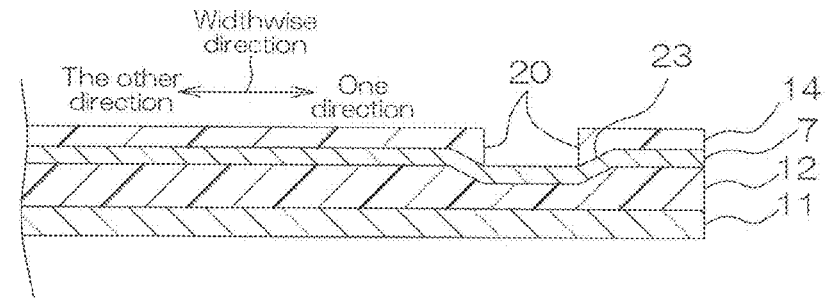

FIG. 3 shows process drawings of an essential part for describing a method for producing the suspension board with circuit shown in FIG. 1:

(a) illustrating a step of preparing a metal supporting board, (b) illustrating a step of forming an insulating base layer on a top surface of the metal supporting board, (c) illustrating a step of forming a conductive pattern on the top surface of the insulating base layer, and (d) illustrating a step of forming an insulating cover layer on the top surface of the insulating base layer so as to cover the conductive pattern.

Figure 4:
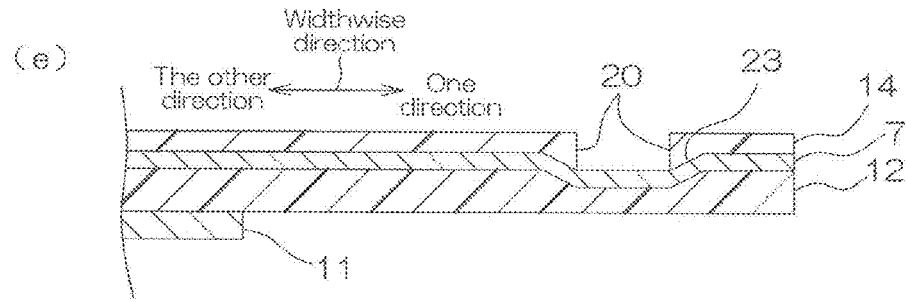
Figure 4:
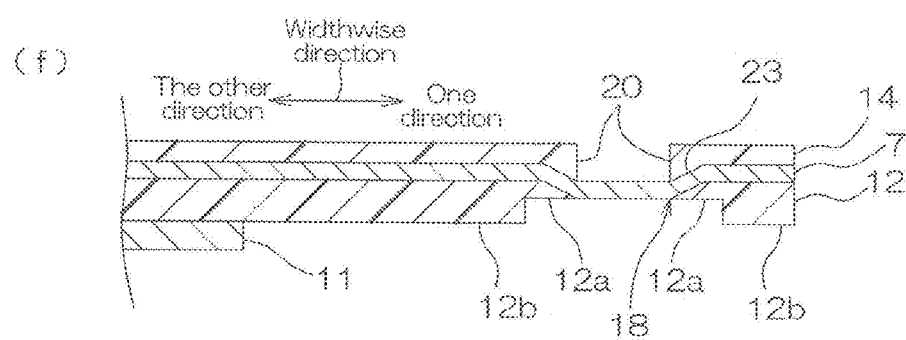
Figure 4:
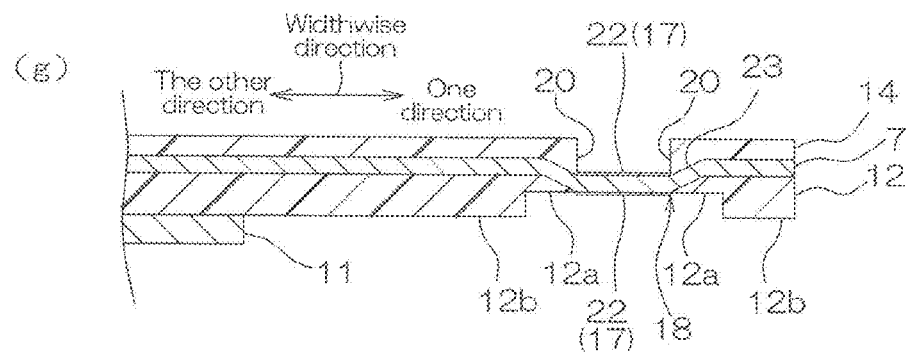

FIG. 4 shows process drawings of an essential part for describing a method for producing the suspension board with circuit shown in FIG. 1, subsequent to FIG. 3:

(e) illustrating a step of removing the metal supporting board and exposing the insulating base layer from a back surface of the metal supporting board, (f) illustrating a step of removing the insulating base layer and forming an adjacent region, and forming a separated region, and (g) illustrating a step of forming a metal plating layer on the conductive pattern and forming a terminal portion.

Figure 5:
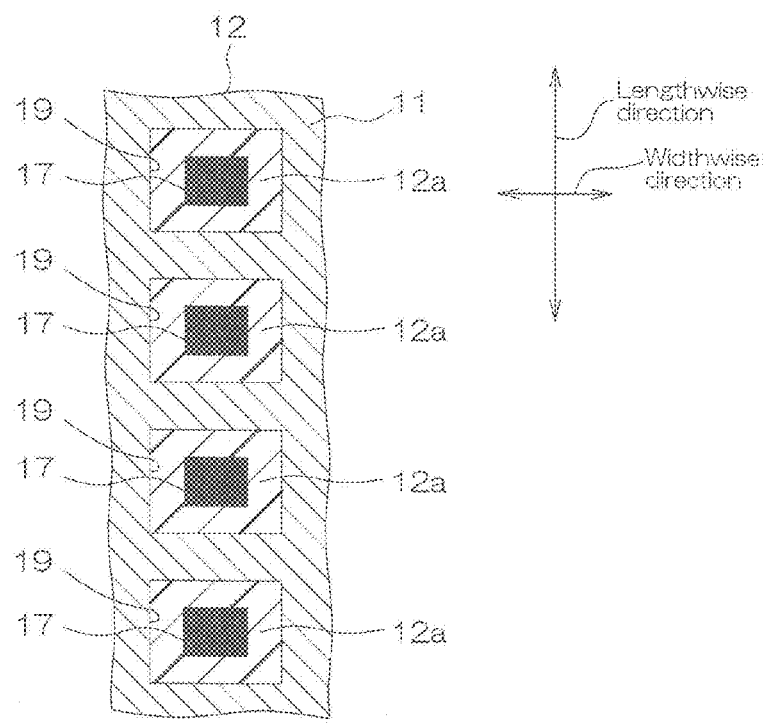
Figure 5:
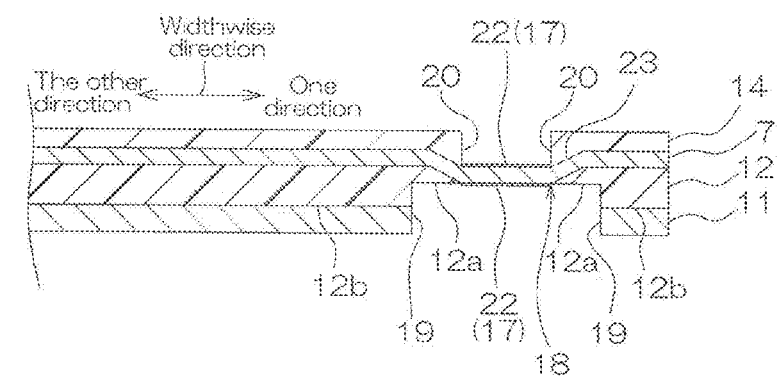

FIG. 5 shows configuration views of essential parts of another embodiment (an embodiment in which an opening is formed, in a portion corresponding to the adjacent region, in the metal supporting board) of the suspension board with circuit of the present invention:

(a) illustrating an enlarged bottom view of an essential part of the external-side terminal portion of the suspension board with circuit and (b) illustrating an enlarged sectional view of an essential part of the suspension board with circuit.

Figure 6:
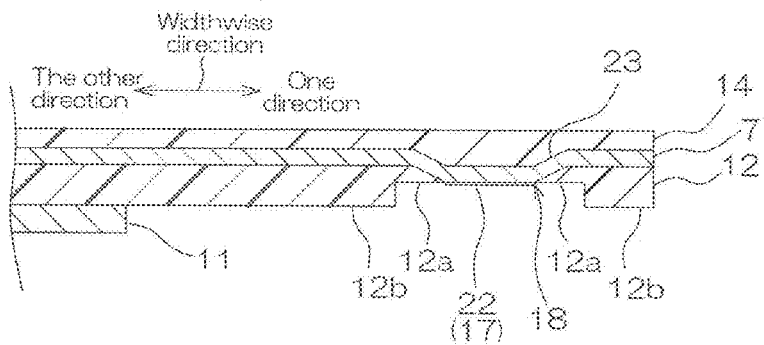

FIG. 6 shows an enlarged sectional view of an essential part of another embodiment (an embodiment in which the opening is not formed in the insulating cover layer) of the suspension board with circuit of the present invention.

Figure 7:
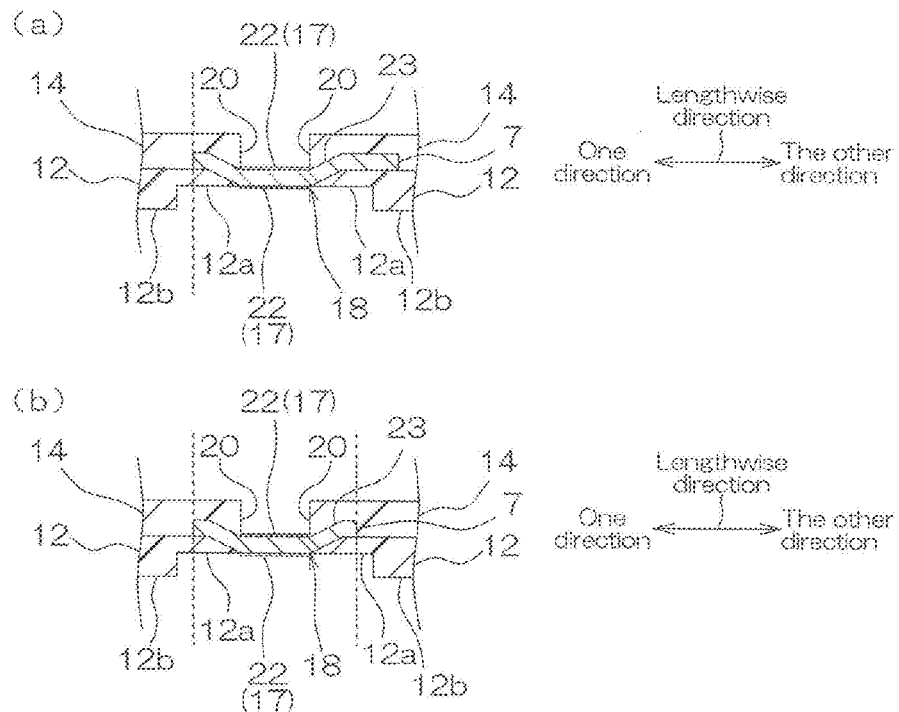

FIG. 7 shows configuration views of an essential part of another embodiment (an embodiment in which the adjacent region protrudes from the conductive pattern in a projected surface of a laminating direction) of the suspension board with circuit of the present invention:

(a) illustrating an enlarged sectional view of an essential part of an embodiment in which one side of the lengthwise direction protrudes from the conductive pattern and (b) illustrating an enlarged sectional view of an essential part of an embodiment in which both sides of the lengthwise direction protrude from the conductive pattern.

Figure 8:
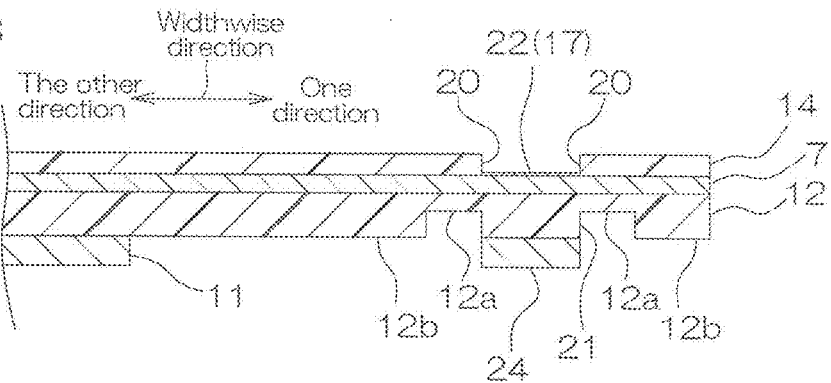

FIG. 8 shows an enlarged sectional view of an essential part of another embodiment (an embodiment in which on the back surface of the external-side terminal portion, the insulating base layer includes a thick layer portion that is thicker than the adjacent region and on the back surface of the thick layer portion, a reinforcing layer is laminated) of the suspension board with circuit of the present invention.

Figure 9:
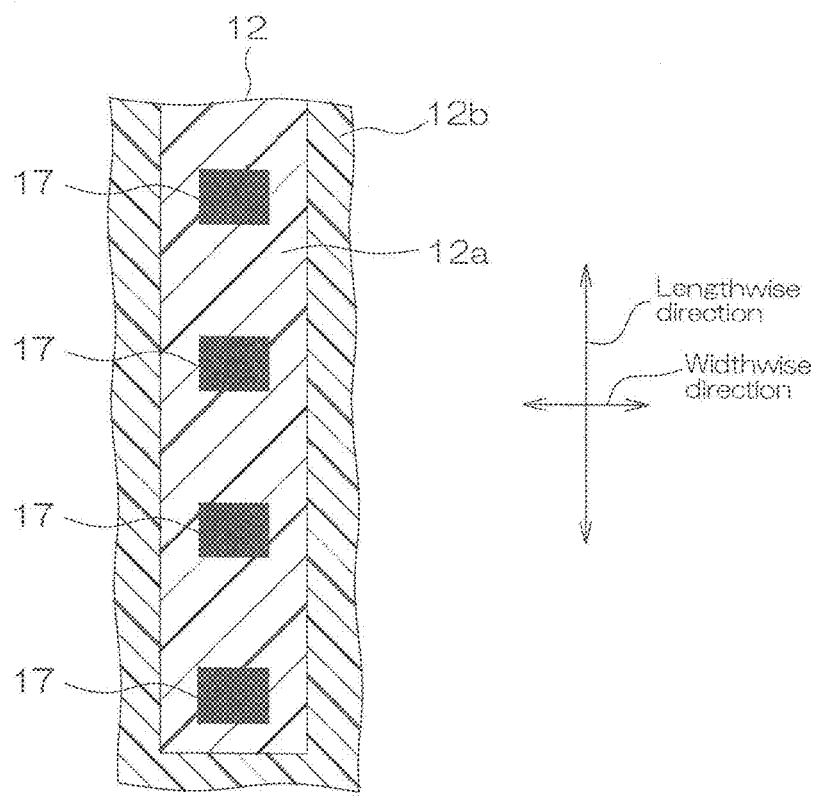

FIG. 9 shows an enlarged bottom view of an essential part of another embodiment (an embodiment in which the adjacent region is provided so as to be continuous over the external-side terminal portions that are adjacent to each other) of the suspension board with circuit of the present invention.

Figure 10:
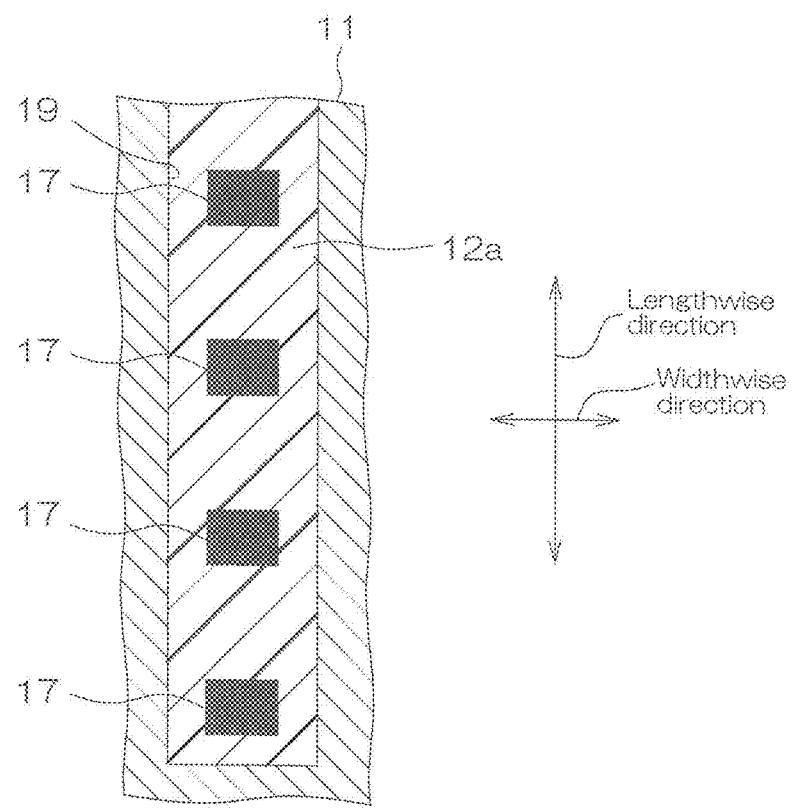

FIG. 10 shows an enlarged bottom view of an essential part of another embodiment (an embodiment in which a metal opening in the metal supporting board is provided so as to be continuous in the portion corresponding to the adjacent region) of the suspension board with circuit of the present invention.

Figure 11:
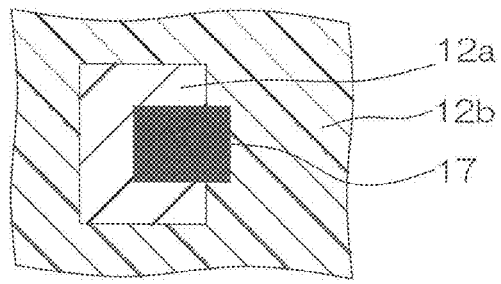

FIG. 11 shows an enlarged bottom view of an essential part of another embodiment (an embodiment in which the adjacent region is in contact with three sides of the external-side terminal portion) of the suspension board with circuit of the present invention.

Figure 12:
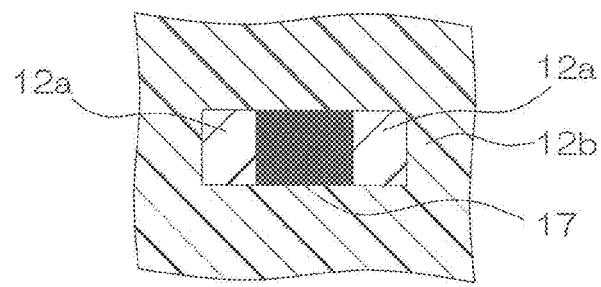

FIG. 12 shows an enlarged bottom view of an essential part of another embodiment (an embodiment in which the adjacent region is in contact with two sides of the external-side terminal portion) of the suspension board with circuit of the present invention.

Figure 13:
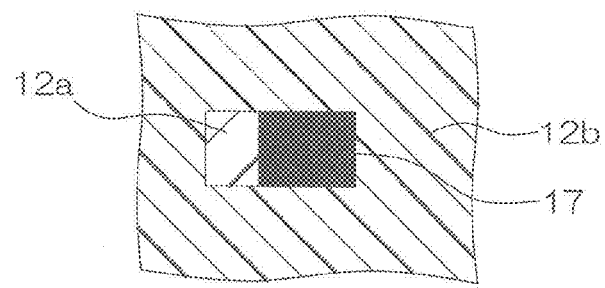

FIG. 13 shows an enlarged bottom view of an essential part of another embodiment (an embodiment in which the adjacent region is in contact with one side of the external-side terminal portion) of the suspension board with circuit of the present invention.

Figure 14:
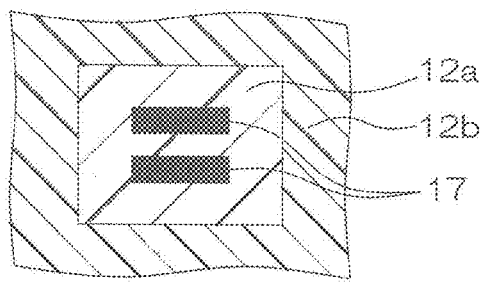

FIG. 14 shows an enlarged bottom view of an essential part of another embodiment (an embodiment in which the external-side terminal portion is divided by the adjacent region) of the suspension board with circuit of the present invention.

Figure 15:
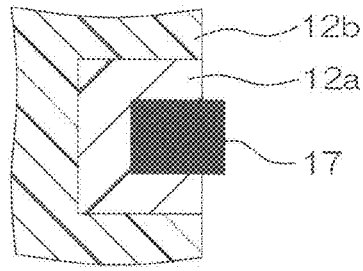

FIG. 15 shows an enlarged bottom view of an essential part of another embodiment (an embodiment in which the external-side terminal portion is formed so as to protrude from the insulating base layer) of the suspension board with circuit of the present invention.

Figure 16:
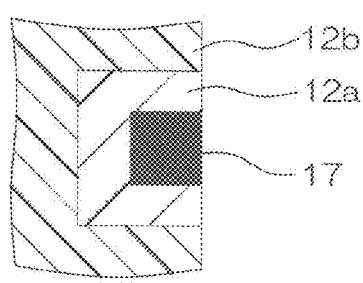

FIG. 16 shows an enlarged bottom view of an essential part of another embodiment (an embodiment in which the external-side terminal portion is formed so that an end edge thereof is flush with that of the insulating base layer) of the suspension board with circuit of the present invention.

Figure 17:
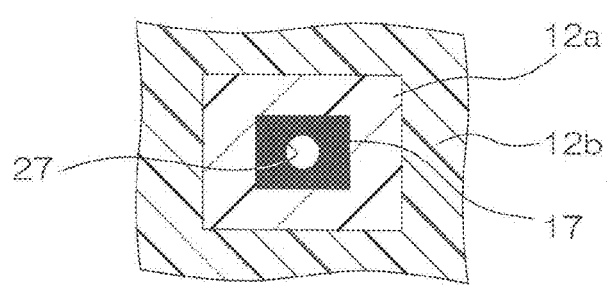

FIG. 17 shows an enlarged bottom view of an essential part of another embodiment (an embodiment in which a penetrating hole in a circular shape in plane view is formed in the external-side terminal portion) of the suspension board with circuit of the present invention.

Figure 18:
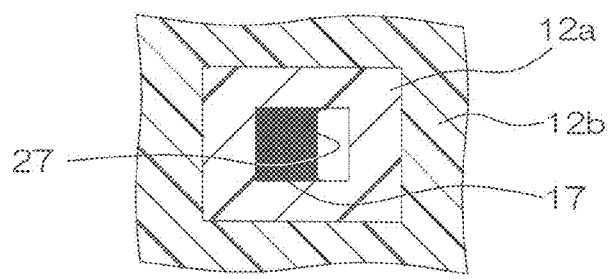

FIG. 18 shows an enlarged bottom view of an essential part of another embodiment (an embodiment in which the penetrating hole in a rectangular shape in plane view is formed in the external-side terminal portion) of the suspension board with circuit of the present invention.

Figure 19:
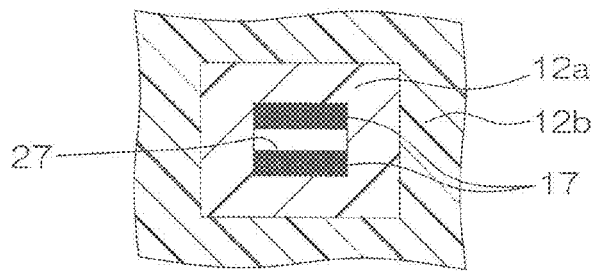

FIG. 19 shows an enlarged bottom view of an essential part of another embodiment (an embodiment in which the external-side terminal portion is divided into plural pieces by forming the penetrating hole in the external-side terminal portion) of the suspension board with circuit of the present invention.

Figure 20:
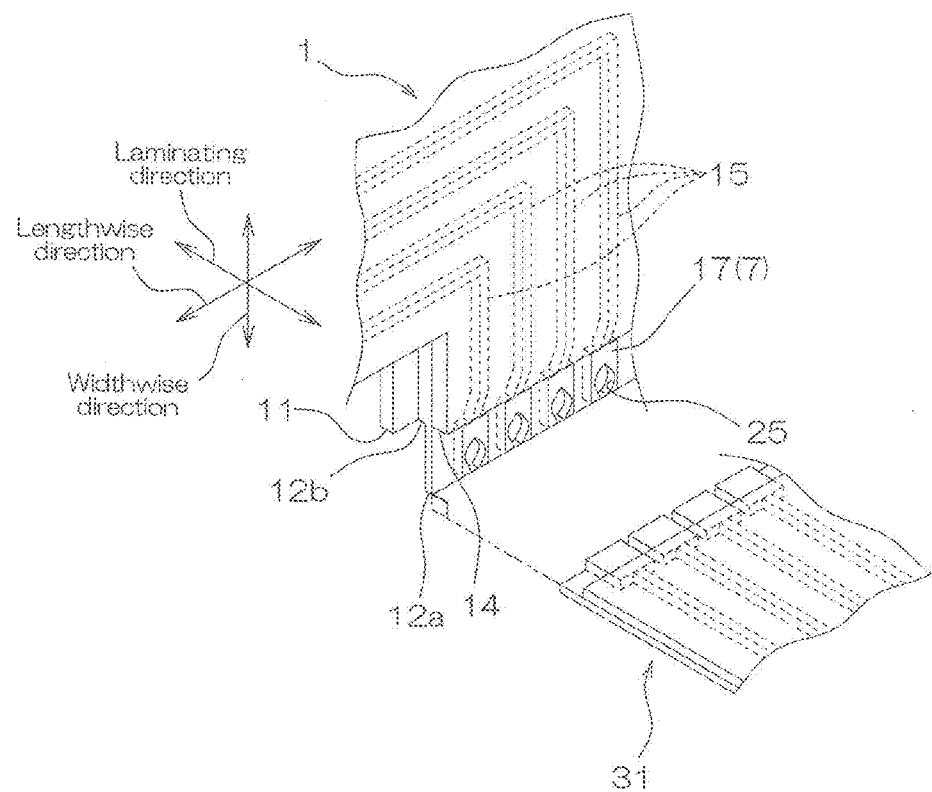

FIG. 20 shows a perspective view of an essential part of another embodiment (an embodiment in which a cut-out portion is formed in the external-side terminal portion) of the suspension board with circuit of the present invention.

Figure 21:
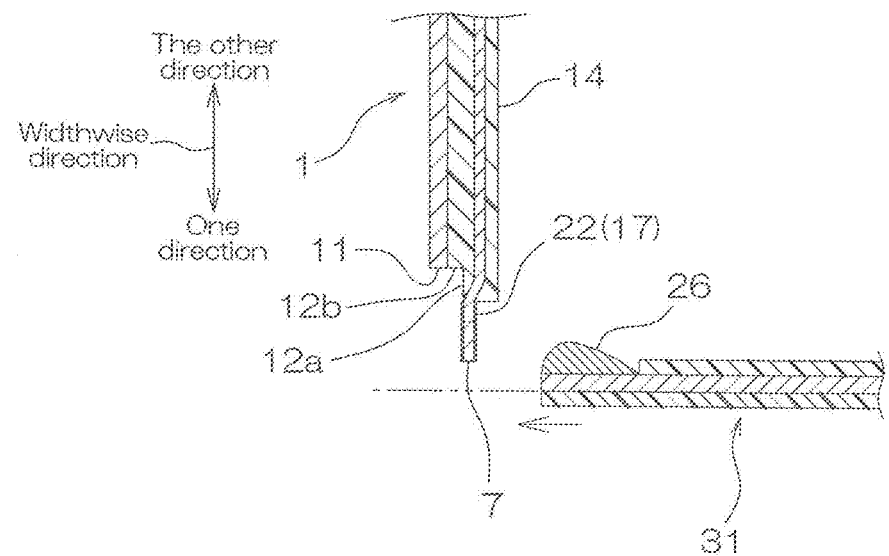

FIG. 21 shows an enlarged sectional view of an essential part of the suspension board with circuit and the external circuit board shown in FIG. 20.

Figure 22:
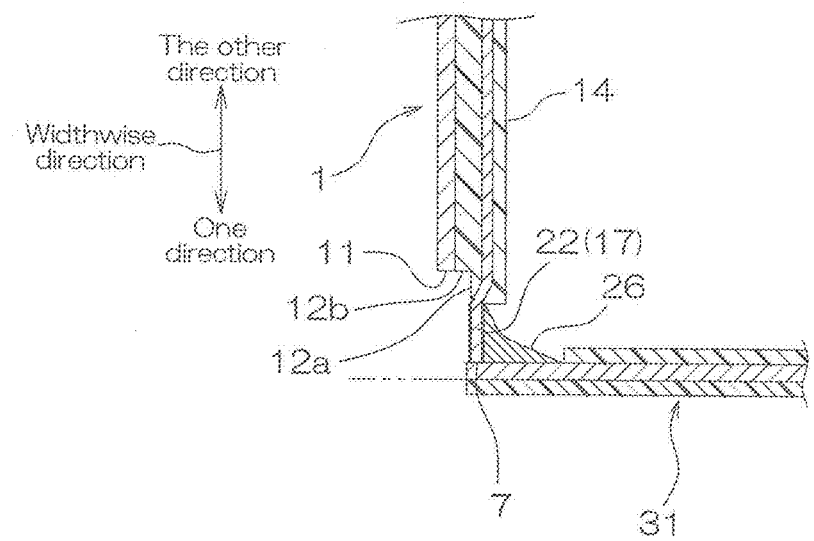

FIG. 22 shows an enlarged sectional view of an essential part showing a connecting state of the suspension board with circuit and the external circuit board shown in FIG. 21.

DETAILED DESCRIPTION OF THE INVENTION

Figure 2:
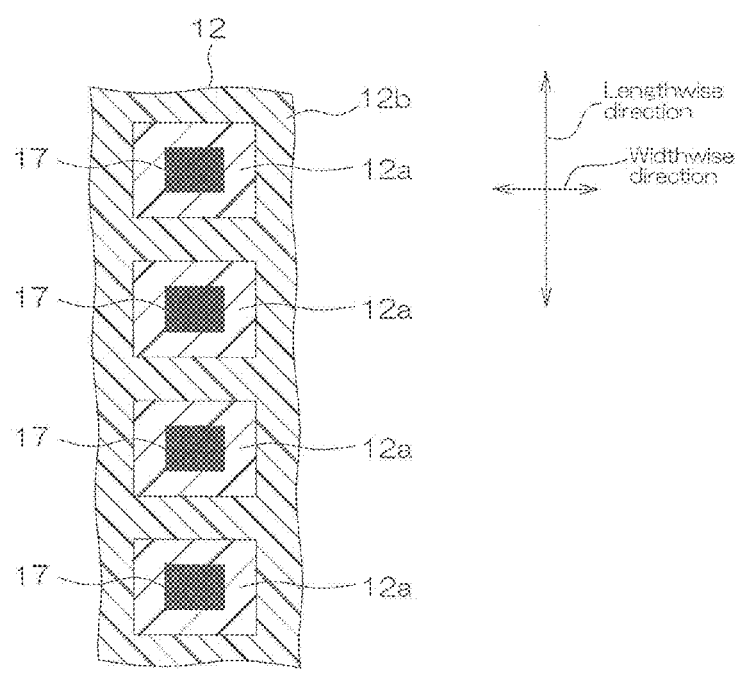
FIG. 2 shows configuration views of essential parts of the suspension board with circuit shown in FIG. 1.
Figure 2:
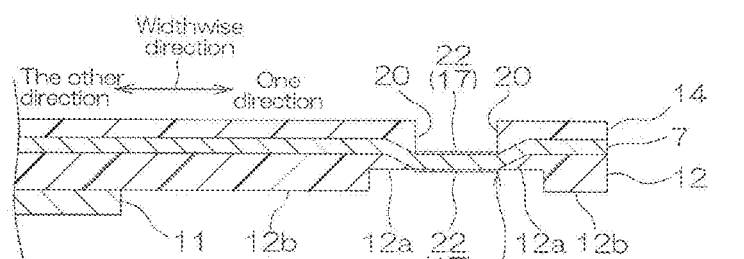
Figure 2:
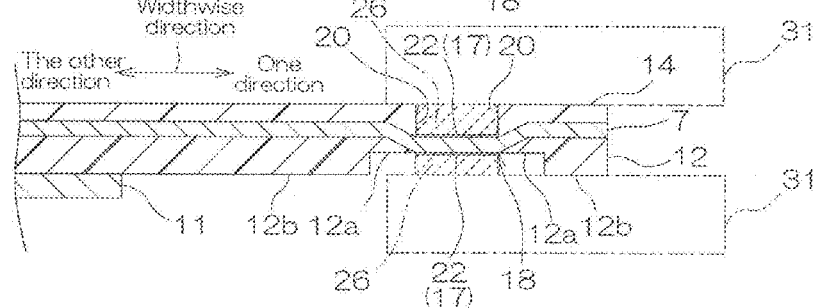

FIG. 1 shows a plan view of one embodiment of a suspension board with circuit of the present invention. FIG. 2 shows configuration views of essential parts of the suspension board with circuit shown in FIG. 1: FIG. 2 (*a*) illustrating an enlarged bottom view of a region A of an external-side terminal portion of the suspension board with circuit shown in FIG. 1, FIG. 2 (*b*) illustrating an enlarged sectional view, taken along the line B-B of the suspension board with circuit shown in FIG. 1, and FIG. 2 (*c*) illustrating an enlarged sectional view, taken along the line B-B, showing a connecting state of the suspension board with circuit shown in FIG. 1 with an external circuit board.

In FIG. 1, an insulating cover layer 14 to be described later is omitted so as to clearly show the relative arrangement of a conductive pattern 7 to be described later.

In FIGS. 1 and 2, a suspension board with circuit 1 is mounted with a magnetic head (not shown) in a hard disk drive and supports the magnetic head while keeping a minute gap between the magnetic head and a hard disk (not shown) against an airflow caused when the magnetic head and the hard disk travel relatively to each other.

As shown in FIG. 1, the suspension board with circuit 1 is formed into a flat belt shape extending in a lengthwise direction (a front-rear direction) and integrally includes a wire portion 2 that is disposed at the other side in the lengthwise direction (hereinafter, referred to as the rear side) and a mounting portion 3 that is disposed at one side of the wire portion 2 (hereinafter, referred to as the front side) in the lengthwise direction.

The wire portion 2 extends in the lengthwise direction and is formed into a generally L-shape in plane view in which the rear end portion thereof protrudes toward one side in a widthwise direction (a direction perpendicular to the lengthwise direction). The wire portion 2 is defined, as a region in which a back surface (a lower surface) thereof is to be mounted on and supported by a load beam that is not shown, in the suspension board with circuit 1.

In the wire portion 2, in a protruding portion that protrudes toward the widthwise direction, an external-side terminal portion 17 to be described later is formed at one end portion in the widthwise direction thereof. At the time of use of the suspension board with circuit 1, a connecting terminal portion of an external circuit board 31 is electrically connected to the external-side terminal portion 17.

The mounting portion 3 is, when the wire portion 2 is mounted on the load beam, defined as a region that is exposed from the load beam without being mounted thereon. To be specific, the mounting portion 3 is, in the suspension board with circuit 1, formed as one end portion (the front end portion) in the lengthwise direction on which a slider 30 (ref: a chain double-dashed line in FIG. 1, hereinafter the same) mounted with the magnetic head is mounted.

To be specific, the mounting portion 3 is formed to be continuous from the front end of the wire portion 2 and is formed into a generally rectangular shape in plane view protruding toward the both widthwise outer sides with respect to the wire portion 2.

In the mounting portion 3, in plane view, a slit 4 in a generally U-shape opening toward the front side of the mounting portion 3 is formed. The mounting portion 3 is defined by a gimbal portion 5 that is sandwiched by the slit 4 in the widthwise direction and an outrigger portion 8 that is disposed at the both widthwise outer sides of the slit 4.

On a top surface (an upper surface) of the gimbal portion 5, a head-side terminal portion 16 to be described later is formed. At the time of use of the suspension board with circuit 1, the slider 30 is mounted and is electrically connected to the head-side terminal portion 16.

As shown in FIG. 2 (*b*), the suspension board with circuit 1 includes a metal supporting board 11, an insulating base layer 12 that is formed on the top surface of the metal supporting board 11, the conductive pattern 7 that is formed on the top surface of the insulating base layer 12 in order to electrically connect the external circuit board (for example, a read/write board) 31 to the magnetic head (not shown), and the insulating cover layer 14 that is formed on the top surface of the insulating base layer 12 so as to cover the conductive pattern 7.

The metal supporting board 11 forms an outer shape of the suspension board with circuit 1. In the gimbal portion 5 of the metal supporting board 11, the slit 4 is formed to have an opening and in the rear end portion of the wire portion 2 (a region in which the external-side terminal portion 17 (described later) is formed), the metal supporting board 11 is cut out so as to retract toward the front side with respect to the rear end portion of the insulating base layer 12.

The metal supporting board 11 is formed of a metal material such as stainless steel, 42-alloy, aluminum, copper-beryllium, and phosphor bronze. Preferably, the metal supporting board 11 is formed of stainless steel. The metal supporting board 11 has a thickness in the range of, for example, 15 to 50 μm, or preferably 20 to 30 μm.

The insulating base layer 12 is formed, in a portion in which the conductive pattern 7 is formed, on the top surface of the metal supporting board 11.

The insulating base layer 12 is formed of an insulating material such as a synthetic resin including polyimide resin (for example, aliphatic polyimide resin, aromatic polyimide resin, or the like), polyamide imide resin, acrylic resin, polyether nitrile resin, polyether sulfone resin, polyethylene terephthalate resin, polyethylene naphthalate resin, and polyvinyl chloride resin. Preferably, the insulating base layer 12 is formed of polyimide resin, or more preferably of aromatic polyimide resin.

The insulating base layer 12 is, at the rear end portion of the wire portion 2 (to be more specific, the rear side portion including the protruding portion of the wire portion 2), formed so as to protrude toward the rear side compared to the rear end portion of the metal supporting board 11.

As shown in FIG. 2 (b), in the insulating base layer 12 at the rear end portion of the wire portion 2, a base opening 18 in which the external-side terminal portion 17 (described later) is buried is formed in a region in which the external-side terminal portion 17 (described later) is formed.

The insulating base layer 12, in a projected surface when projected in a laminating direction (a direction perpendicular to the lengthwise direction and the widthwise direction, that is a thickness direction), includes an adjacent region 12a that is adjacent to the external-side terminal portion 17 (described later) and a separated region 12b that is separated from the external-side terminal portion 17 (described later) so as to sandwich the adjacent region 12a with the external-side terminal portion 17.

To be specific, as shown in FIG. 2 (a), in a bottom view of the suspension board with circuit 1, the adjacent region 12a is formed into a generally rectangular frame shape in plane view that is in contact with all the sides of the outer circumference of the external-side terminal portion 17 (described later) and surrounds the external-side terminal portion 17 (described later) so as to be adjacent thereto.

A plurality (eight pieces) of the adjacent regions 12a are independently provided so as to correspond to a plurality (eight pieces) of the external-side terminal portions 17 (described later).

The separated region 12b is formed as a region that is in contact with the outer circumference of the adjacent region 12a and surrounds the adjacent region 12a so as to be adjacent thereto. The separated region 12b is formed respectively between the external-side terminal portions 17 (described later).

As shown in FIG. 2 (b), in the insulating base layer 12, the adjacent region 12a is formed to be thinner than the separated region 12b. To be specific, the adjacent region 12a has a thickness in the range of, for example, 0.2 to 27 μm, or preferably 0.4 to 10.5 μm. The separated region 12b has a thickness in the range of, for example, 4 to 30 μm, or preferably 1.2 to 13.5 μm.

A difference in thickness between the adjacent region 12a and the separated region 12b is in the range of, for example, 0.4 to 28.5 μm, or preferably 0.5 to 1.4 μm. The thickness of the adjacent region 12a with respect to that of the separated region 12b is, for example, 90% or less, or preferably 70% or less, and is, for example, 5% or more, or preferably 10% or more.

When the thickness of the adjacent region 12a and the separated region 12b is within the above-described range, the efficient heat dissipation can be ensured. Therefore, when the external-side terminal portion 17 and the connecting terminal portion of the external circuit board 31 (ref: FIG. 2 (c)) are connected to each other by a metal that is heated and melted with a high energy density by a laser and the like, a burn in the insulating base layer 12 is prevented, so that the external-side terminal portion 17 and the connecting terminal portion of the external circuit board 31 can be connected to each other with the excellent reliability.

When a solder ball 26 (described later, ref: FIGS. 21 and 22) is melted by laser irradiation, the thickness of the adjacent region 12a is adjusted so that, for example, the energy transmittance with respect to the total amount of the laser irradiation energy is, for example, 40% or more.

As shown in FIG. 2 (a), the adjacent region 12a has a length (a length in the lengthwise direction) in the range of, for example, 10 to 2000 μm, or preferably 50 to 1000 μm and has a width (a length in the widthwise direction) in the range of, for example, 10 to 5000 μm, or preferably 50 to 2000 μm.

As shown in FIG. 1, the conductive pattern 7 is formed on the top surface of the insulating base layer 12 and integrally includes the external-side terminal portion 17, as a terminal portion, so as to be joined by the solder ball 26 (described later) as a melted metal (a metal capable of being melted), the head-side terminal portion 16, and a wire 15 that connects the external-side terminal portion 17 to the head-side terminal portion 16.

A plurality (eight pieces) of the wires 15 are provided over the lengthwise direction of the wire portion 2 and the mounting portion 3. The wires 15 are disposed in parallel at spaced intervals to each other in the widthwise direction and in the wire portion 2, are bent into a generally L-shape in plane view along the outer shape of the wire portion 2 so that the rear end edge of each of the wires 15 is connected to the external-side terminal portion 17.

A plurality (eight pieces) of the wires 15 include a plurality (four pieces) of one-side wires 15a that are disposed at one side in the widthwise direction of the mounting portion 3 and the wire portion 2 (except for the protruding portion) and a plurality (four pieces) of the other-side wires 15b that are disposed at the other side in the widthwise direction of the mounting portion 3 and the wire portion 2 (except for the protruding portion).

The one-side wires 15a are, in the mounting portion 3, disposed so as to be along the outrigger portion 8 at one side in the widthwise direction. The other-side wires 15b are disposed so as to be along the outrigger portion 8 at the other side in the widthwise direction.

Each of the wires 15 is disposed so as to extend toward the widthwise inner side in the front end portion of the mounting portion 3 and then is further folded toward the rear side to reach the gimbal portion 5.

The external-side terminal portion 17 is disposed in the protruding portion at the rear side portion of the wire portion 2 (the region in which the metal supporting board 11 is not provided) so as to be along one end edge in the widthwise direction of the protruding portion. The external-side terminal portion 17 is, in the above-described base opening 18, formed into a generally rectangular shape (square land) in plane view that protrudes toward the widthwise direction compared to the wire 15.

A plurality (eight pieces) of the external-side terminal portions 17 are provided so that the rear end portions of the wires 15 are connected thereto, respectively and are disposed at spaced intervals to each other in the lengthwise direction.

The external-side terminal portions 17 include external-side terminal portions 17a at one side that are connected corresponding to a plurality (four pieces) of the one-side wires 15a and external-side terminal portions 17b at the other side that are connected corresponding to a plurality (four pieces) of the other-side wires 15b. Each of the external-side terminal portions 17a at one side and each of the external-side terminal portions 17b at the other side are disposed at spaced intervals to each other in the lengthwise direction, respectively.

The top surface of the external-side terminal portion 17 is exposed from a cover opening 20 (described later) in the insulating cover layer 14 (described later) and the back surface thereof is exposed from the base opening 18 in the insulating base layer 12.

The external-side terminal portion 17 has a length in the range of, for example, 20 to 1000 μm, or preferably 25 to 800 μm and has a width in the range of, for example, 20 to 1000 μm, or preferably 25 to 800 μm.

A metal plating layer 22 is laminated on the external-side terminal portion 17.

Examples of a metal for forming the metal plating layer 22 include copper, nickel, chromium, and gold.

The metal plating layer 22 can be formed as a single layer or multiple layers. The thickness of the metal plating layer 22 is set appropriately according to its necessity and use.

In this way, as shown in FIG. 2 (c), at the both surface sides of the top surface side and the back surface side of the suspension board with circuit 1, the external-side terminal portion 17 is capable of being electrically connected to the external circuit board 31 via the melted solder ball 26 (described later).

The head-side terminal portion 16 is, in the mounting portion 3, disposed at the front side of the gimbal portion 5. A plurality (eight pieces) of the head-side terminal portions 16 are provided so that the front end portions of the wires 15 are connected thereto, respectively and are disposed at spaced intervals to each other in the widthwise direction.

The head-side terminal portions 16 include head-side terminal portions 16a at one side that are connected corresponding to a plurality (four pieces) of the one-side wires 15a and head-side terminal portions 16b at the other side that are connected corresponding to a plurality (four pieces) of the other-side wires 15b. Each of the head-side terminal portions 16a at one side and each of the head-side terminal portions 16b at the other side are disposed at spaced intervals to each other in the widthwise direction, respectively.

The top surface of the head-side terminal portion 16 is exposed from the insulating cover layer 14 (described later).

In the same manner as in the external-side terminal portion 17, the above-described metal plating layer 22 is laminated on the head-side terminal portion 16.

In this way, the magnetic head (not shown) of the slider 30 is capable of being electrically connected to the head-side terminal portion 16 via the solder ball 26 (not shown).

The conductive pattern 7 has a thickness in the range of, for example, 3 to 50 μm, or preferably 5 to 20 μm.

Each of the wires 15 has a width in the range of, for example, 10 to 200 μm, or preferably 12 to 120 μm. A space between the wires 15 is in the range of, for example, 10 to 1000 μm, or preferably 12 to 100 μm.

Each of the head-side terminal portions 16 has a length and a width in the range of, for example, 20 to 1000 μm, or preferably 30 to 800 μm. A space between the external-side terminal portions 17 and a space between the head-side terminal portions 16 are in the range of, for example, 20 to 1000 μm, or preferably 30 to 800 μm.

In the conductive pattern 7, a write signal that is transmitted from the external circuit board 31 (ref: FIG. 2 (c)) is entered into the magnetic head (not shown) of the slider 30 (not shown) via the external-side terminal portion 17, the wire 15, and the head-side terminal portion 16. Also, a read signal that is read with the magnetic head (not shown) is entered into the external circuit board 31 (ref: FIG. 2 (c)) via the head-side terminal portion 16, the wire 15, and the external-side terminal portion 17.

The insulating cover layer 14 is formed in a portion in which the insulating base layer 12 is formed. And the cover opening 20, as an opening, is formed in the insulating cover layer 14 so as to expose the external-side terminal portion 17 and the head-side terminal portion 16.

In this way, the insulating cover layer 14 is formed into a pattern of covering the wire 15 and exposing the external-side terminal portion 17 and the head-side terminal portion 16 from the cover opening 20, corresponding to the conductive pattern 7.

The insulating cover layer 14 is formed of, for example, the above-described insulating material.

The insulating cover layer 14 has a thickness in the range of, for example, 1 to 40 μm, or preferably 1 to 10 μm.

Next, a method for producing the suspension board with circuit 1 is described with reference to FIGS. 3 and 4.

In this method, as shown in FIG. 3 (a), the metal supporting board 11 is first prepared.

Next, as shown in FIG. 3 (b), a varnish of a photosensitive insulating material is applied onto the top surface of the metal supporting board 11 and is then dried. Thereafter, the dried varnish is exposed to light and is then developed to be heat cured, so that the insulating base layer 12 is formed in a region in which the conductive pattern 7 is formed with the above-described pattern.

At this time, the thickness of the insulating base layer 12 is adjusted by a known method such as a gradation exposure so that a concave portion 23 is formed in the region in which the external-side terminal portion 17 is formed.

The concave portion 23 includes an inclined surface that inclines from the top surface side toward the back surface side in the insulating base layer 12 and a bottom surface that is surrounded by the inclined surface. The depth and the like of the concave portion 23 are set appropriately according to its purpose and use.

Next, as shown in FIG. 3 (c), the conductive pattern 7 is formed on the top surface of the insulating base layer 12 by an additive method, a subtractive method, or the like. In this way, the conductive pattern 7 is formed so as to be dented, following the concave portion 23, in the concave portion 23 in the insulating base layer 12.

Next, as shown in FIG. 3 (d), a varnish of a photosensitive insulating material is applied onto the top surface of the insulating base layer 12 so as to cover the conductive pattern 7 and is then dried. Thereafter, the dried varnish is exposed to light and is then developed to be heat cured. In this way, the insulating cover layer 14 is formed in the region in which the conductive pattern 7 is formed (except for the region in which the head-side terminal portion 16 and the external-side terminal portion 17 are formed) with the above-described pattern.

In this way, the head-side terminal portion 16 (not shown) and the external-side terminal portion 17 (the external-side terminal portion 17 at the top surface side of the conductive pattern 7) are formed so as to expose from the insulating cover layer 14.

Next, as shown in FIG. 4 (e), the metal supporting board 11 corresponding to the slit 4 and the metal supporting board 11 at the rear end portion of the wire portion 2 are removed to form the slit 4, and at the rear end portion of the wire portion 2, the insulating base layer 12 is exposed from the back surface of the metal supporting board 11.

In the removal of the metal supporting board 11, for example, an etching method such as a dry etching (for example, a plasma etching) or a wet etching (for example, a chemical etching), for example, a drilling and boring, a laser processing, or the like is used. Preferably, the wet etching is used.

Next, as shown in FIG. 4 (f), in the projected surface when projected in the laminating direction of the insulating base layer 12, a portion of the insulating base layer 12, which is overlapped and adjacent to the external-side terminal portion 17, is removed.

In this way, the adjacent region 12a is formed and the base opening 18 is formed in the concave portion 23. And the conductive pattern 7 is exposed from the base opening 18 and in the concave portion 23, the external-side terminal portion 17 (the external-side terminal portion 17 on the back surface side of the conductive pattern 7) is formed so as to expose from the insulating base layer 12. Also, in this way, the separated region 12b that is separated from the external-side terminal portion 17 so as to sandwich the adjacent region 12a with the external-side terminal portion 17 is formed.

The removal method of the insulating base layer 12 is not particularly limited. For example, a known etching method such as the dry etching or the wet etching, a drilling process, or the laser processing is used.

Next, as shown in FIG. 4 (g), the metal plating layer 22 is formed on the top surface of the external-side terminal portion 17 that is exposed from the cover opening 20 in the insulating cover layer 14 and on the back surface of the external-side terminal portion 17 that is exposed from the base opening 18 in the insulating base layer 12.

To form the metal plating layer 22, for example, after forming a plating resist, which is not shown, in order to cover the metal supporting board 11, for example, an electrolytic plating or a non-electrolytic plating, or preferably an electrolytic gold plating or a non-electrolytic gold plating is performed. Thereafter, the plating resist is removed.

Subsequently, though not shown, the outer shape of the metal supporting board 11 is cut out, so that the suspension board with circuit 1 is obtained.

The suspension board with circuit 1 can also be formed as a suspension board with circuit assembly sheet in which the insulating base layer 12, the conductive pattern 7, and the insulating cover layer 14 are laminated on one piece of the metal supporting board 11, and a plurality of the suspension boards with circuits 1 are formed.

As referred in FIG. 1, the suspension board with circuit 1 that is obtained in this way is, at the time of its use, mounted with the slider 30, and the terminal portion thereof is connected to the head-side terminal portion 16 and the connecting terminal portion of the external circuit board 31 is electrically connected to the external-side terminal portion 17.

The method for connecting the connecting terminal portion of the external circuit board 31 to the external-side terminal portion 17 is as follows. First, the solder ball 26 is disposed between the connecting terminal portion of the external circuit board 31 and the external-side terminal portion 17. The solder ball 26 is formed of a known solder material.

Subsequently, the solder ball 26 is heated by, for example, a known method such as heat irradiation by a heater or laser light irradiation. Preferably, the solder ball 26 is heated by the laser light irradiation to be melted and then is solidified. In this way, the connecting terminal portion (not shown) of the magnetic head is electrically connected to the head-side terminal portion 16, and the connecting terminal portion of the external circuit board 31 is electrically connected to the external-side terminal portion 17 (ref: FIG. 2 (c)).

At this time, in the heating and melting of the solder ball 26, above all, in the heating and melting with a high density energy by the laser light irradiation and the like, a disadvantage may occur, such as that the insulating base layer 12 is burned around the external-side terminal portion 17, so that the connecting reliability between the terminal portions may be reduced.

On the other hand, in the above-described suspension board with circuit 1, the insulating base layer 12, in the projected surface when projected in the laminating direction, includes the adjacent region 12a that is adjacent to the external-side terminal portion 17 and the separated region 12b that is separated from the external-side terminal portion 17 so as to sandwich the adjacent region 12a with the external-side terminal portion 17, and the adjacent region 12a is formed to be thinner than the separated region 12b. Therefore, the insulating base layer 12 in the adjacent region 12a is relatively difficult to store heat compared to the insulating base layer 12 in the separated region 12b. As a result, when the external-side terminal portion 17 and the terminal portion of the external circuit board 31 are connected to each other by the solder ball 26 that is heated and melted with the high energy density, the burn is prevented, so that the terminal portions can be connected to each other with the excellent reliability.

Above all, in the suspension board with circuit 1, when the insulating base layer 12 is formed of a dark colored resin such as an aromatic polyimide resin and the solder ball 26 is heated and melted by the laser light irradiation and the like, excellent energy permeability is ensured by the adjacent region 12a that is formed to be thinner than the separated region 12b, so that the burn can be prevented.

In the suspension board with circuit 1, the conductive pattern 7 is covered by the insulating cover layer 14, so that the conductive pattern 7 can be protected. In addition, the external-side terminal portion 17 is exposed from the cover opening 20 in the insulating cover layer 14, so that the efficient heat dissipation is ensured. Therefore, the burn can further be prevented.

In addition, in the suspension board with circuit 1, the adjacent region 12a is independently provided in each of a plurality (eight pieces) of the external-side terminal portions 17, so that the separated region 12b is formed between the external-side terminal portions 17 and therefore, the excellent mechanical strength between the external-side terminal portions 17 can be ensured by the separated region 12b.

In the above-described description, eight pieces of the wires 15, the head-side terminal portions 16, and the external-side terminal portions 17 are provided, respectively. However, the number thereof is not particularly limited. For example, a single piece (one piece), two to seven pieces, or nine pieces or more thereof can be provided, respectively. Preferably, as illustrated in FIG. 1, plural pieces (eight pieces) thereof are provided.

FIG. 5 shows configuration views of essential parts of another embodiment (an embodiment in which an opening is formed, in a portion corresponding to the adjacent region, in the metal supporting board) of the suspension board with circuit of the present invention: FIG. 5 (a) illustrating an enlarged bottom view of an essential part of the external-side terminal portion of the suspension board with circuit and FIG. 5 (b) illustrating an enlarged sectional view of an essential part of the suspension board with circuit.

In each figure to be described below, the same reference numerals are provided for members corresponding to each of those described above, and their detailed description is omitted.

In the above-described description, the metal supporting board 11 is cut out so as to retract toward the front side with respect to the rear end portion of the insulating base layer 12. Alternatively, for example, as shown in FIG. 5, the metal supporting board 11 is formed at the rear end portion of the wire portion 2 and a metal opening 19, as an opening, can be formed, at least in the portion corresponding to the adjacent region 12a, in the metal supporting board 11.

In the embodiment, as shown in FIG. 5 (a), a plurality (eight pieces) of the metal openings 19 in the metal supporting board 11 are independently provided in the portion corresponding to the adjacent region 12a.

The metal opening 19 has a length in the range of, for example, 40 to 2000 μm, or preferably 125 to 1000 μm. The metal opening 19 has a width in the range of, for example, 40 to 2000 μm, or preferably 125 to 2000 μm.

Each of the adjacent regions 12a and each of the external-side terminal portions 17 (on the back surface side) exposed from the base opening 18 are exposed from each of the metal openings 19, respectively.

The metal opening 19 can be formed by appropriately adjusting the removal of the metal supporting board 11 (to be specific, an etching and the like) and the like.

The metal opening 19 in the metal supporting board 11 is independently provided in the portion corresponding to the adjacent region 12a, so that the metal supporting board 11 is disposed in the portion corresponding to the separated region 12b (on the back surface side of the separated region 12b).

In the embodiment, the excellent mechanical strength is ensured by the metal supporting board 11 and the adjacent region 12a and the external-side terminal portion 17 are exposed by the metal opening 19, so that the efficient heat dissipation is ensured. Therefore, the burn can further be prevented.

FIG. 6 shows an enlarged sectional view of an essential part of another embodiment (an embodiment in which the opening is not formed in the insulating cover layer) of the suspension board with circuit of the present invention.

In the above-described description, the cover opening 20 is formed in the insulating cover layer 14 and the external-side terminal portion 17 is exposed from the cover opening 20. Alternatively, for example, as shown in FIG. 6, the insulating cover layer 14 can be laminated without forming an opening in the portion corresponding to the external-side terminal portion 17.

In this case, the external-side terminal portion 17 is not formed on the top surface side of the conductive pattern 7 and is formed only on the back surface side thereof.

Also, in the suspension board with circuit 1, the insulating base layer 12, in the projected surface when projected in the laminating direction, includes the adjacent region 12a that is adjacent to the external-side terminal portion 17 and the separated region 12b that is separated from the external-side terminal portion 17 so as to sandwich the adjacent region 12a with the external-side terminal portion 17, and the adjacent region 12a is formed to be thinner than the separated region 12b. Therefore, the insulating base layer 12 in the adjacent region 12a is relatively difficult to store heat compared to the insulating base layer 12 in the separated region 12b. Thus, when the external-side terminal portion 17 and the terminal portion of the external circuit board 31 are connected to each other by the solder ball 26 that is heated and melted with the high energy density, the burn is prevented, so that the terminal portions can be connected to each other with the excellent reliability.

FIG. 7 shows configuration views of an essential part of another embodiment (an embodiment in which the adjacent region protrudes from the conductive pattern in a projected surface of a laminating direction) of the suspension board with circuit of the present invention: FIG. 7 (a) illustrating an enlarged sectional view of an essential part of an embodiment in which one side of the lengthwise direction protrudes from the conductive pattern and FIG. 7 (b) illustrating an enlarged sectional view of an essential part of an embodiment in which both sides of the lengthwise direction protrude from the conductive pattern.

FIG. 7 shows an enlarged sectional view, taken along the lengthwise direction of the wire portion 2, which is different from the enlarged sectional views of essential parts (the sectional views, taken along the widthwise direction of the wire portion 2) that are shown in each of the views described above.

In the suspension board with circuit 1, in the projected surface when projected in the laminating direction of the insulating base layer 12 and the conductive pattern 7, one lengthwise side end portion (FIG. 7 (a)) or both lengthwise side end portions (FIG. 7 (b)) of the adjacent region 12a protrude from the conductive pattern 7.

That is, in the above-described projected surface, the one lengthwise side end portion (FIG. 7 (a)) or the both lengthwise side end portions (FIG. 7 (b)) of the conductive pattern 7 are disposed so as to be housed in the lengthwise inner side of the adjacent region 12a. In this way, the insulating cover layer 14 is directly laminated on the adjacent region 12a.

In the suspension board with circuit 1, the adjacent region 12a protrudes from the conductive pattern 7, so that the insulating cover layer 14 is laminated on the top surface of the adjacent region 12a and therefore, adhesion between the adjacent region 12a in the insulating base layer 12 and the insulating cover layer 14 can be improved.

FIG. 8 shows an enlarged sectional view of an essential part of another embodiment (an embodiment in which on the back surface of the external-side terminal portion, the insulating base layer includes a thick layer portion that is thicker than the adjacent region and on the back surface of the thick layer portion, a reinforcing layer is laminated) of the suspension board with circuit of the present invention.

In the above-described description, the back surface of the conductive pattern 7 is exposed from the base opening 18 in the insulating base layer 12 to form the external-side terminal portion 17. Alternatively, for example, as shown in FIG. 8, a thick layer portion 21 can be formed on the back surface side of the conductive pattern 7 and a reinforcing layer 24 can be laminated on the back surface thereof.

In the embodiment, as shown in FIG. 8, in the insulating base layer 12, the concave portion 23 and the base opening 18 on the inner side thereof are not provided. The conductive pattern 7 is provided so as not to expose from the lower surface of the insulating base layer 12.

The insulating base layer 12 includes the adjacent region 12a and includes, on the back surface of the external-side terminal portion 17, the thick layer portion 21 that is thicker than the adjacent region 12a.

The thick layer portion 21 is, in the projected surface when projected in the laminating direction, overlapped with the external-side terminal portion 17. The thickness of the thick layer portion 21 is, for example, the same as that of the separated region 12b and is, to be specific, in the range of, for example, 4 to 30 µm, or preferably 4 to 15 µm.

The adjacent region 12a and the thick layer portion 21 can be formed by appropriately adjusting the exposure and development in the formation of the insulating base layer 12, the removal of the insulating base layer 12 (to be specific, the etching and the like), and the like.

The reinforcing layer 24 is laminated on the back surface of the thick layer portion 21.

The reinforcing layer 24 is made of the metal supporting board 11 and is disposed so as to be overlapped with the external-side terminal portion 17 and the thick layer portion 21 in the projected surface when projected in the laminating direction.

The reinforcing layer 24 can be formed by appropriately adjusting the removal of the metal supporting board 11 (to be specific, the etching and the like) and the like.

In the suspension board with circuit 1, the thick layer portion 21 and the reinforcing layer 24 are laminated on the back surface of the external-side terminal portion 17, so that the excellent mechanical strength of the external-side terminal portion 17 can be ensured.

FIG. 9 shows an enlarged bottom view of an essential part of another embodiment (an embodiment in which the adjacent region is provided so as to be continuous over the external-side terminal portions that are adjacent to each other) of the suspension board with circuit of the present invention.

In the above-described description (ref: FIG. 2), the adjacent region 12a is independently provided in each of a plurality (eight pieces) of the external-side terminal portions 17. Alternatively, for example, as shown in FIG. 9, the adjacent region 12a can be provided so as to be continuous to a plurality (eight pieces) of the external-side terminal portions 17 that are adjacent to each other.

That is, in the above-described description, a plurality (eight pieces) of the adjacent regions 12a are provided so as to correspond to a plurality (eight pieces) of the external-side terminal portions 17. Alternatively, for example, in the projected surface when projected in the laminating direction, a single piece (one piece) of the adjacent region 12a can be provided so as to include all the plurality (eight pieces) of the external-side terminal portions 17.

In the embodiment, though not shown, when the adjacent region 12a is provided so as to be continuous to the external-side terminal portions 17 that are adjacent to each other, the number thereof is not particularly limited. For example, a plurality (two pieces) of the adjacent regions 12a can be provided. To be more specific, for example, in the projected surface when projected in the laminating direction, one piece of the adjacent region 12a can be provided so as to include all the plurality (four pieces) of the external-side terminal portions 17a at one side and the other piece thereof can also be provided so as to include all the plurality (four pieces) of the external-side terminal portions 17b at the other side.

In this case, the adjacent region 12a has a length in the range of, for example, 240 to 20000 µm, or preferably 750 to 10000 µm. The adjacent region 12a has a width in the range of, for example, 40 to 5000 µm, or preferably 125 to 2000 µm.

In the suspension board with circuit 1, the adjacent region 12a is provided so as to be continuous to the external-side terminal portions 17 that are adjacent to each other, so that the heat dissipation is ensured in the large adjacent region 12a and therefore, the burn can be prevented further reliably.

FIG. 10 shows an enlarged bottom view of an essential part of another embodiment (an embodiment in which a metal opening in the metal supporting board is provided so as to be continuous in the portion corresponding to the adjacent region) of the suspension board with circuit of the present invention.

In the above-described description (ref: FIG. 5), the metal opening 19 is independently provided in the portion corresponding to each of a plurality (eight pieces) of the adjacent regions 12a. Alternatively, for example, as shown in FIG. 10, the adjacent region 12a can be provided so as to be continuous to a plurality (eight pieces) of the external-side terminal portions 17 that are adjacent to each other, and the metal opening 19 in the metal supporting board 11 can be provided so as to be continuous in the portion corresponding to the adjacent region 12a.

That is, in the embodiment, for example, in the projected surface when projected in the laminating direction, a single piece (one piece) of the adjacent region 12a is provided so as to include all the plurality (eight pieces) of the external-side terminal portions 17 (ref: FIG. 9), and a single piece (one piece) of the metal opening 19 is provided in the metal supporting board 11 so as to be continuous to the portion corresponding to the adjacent region 12a.

In the embodiment, in the same manner as in the embodiment shown in FIG. 9, though not shown, when the adjacent region 12a is provided so as to be continuous to the external-side terminal portions 17 that are adjacent to each other, the number thereof is not particularly limited. For example, a plurality (two pieces) of the adjacent regions 12a can be provided and also a plurality (two pieces) of the metal openings 19 can be provided so as to correspond thereto. To be more specific, for example, in the projected surface when projected in the laminating direction, one piece of the adjacent region 12a can be provided so as to include all the plurality (four pieces) of the external-side terminal portions 17a at one side; the other piece thereof can be provided so as to include all the plurality (four pieces) of the external-side terminal portions 17b at the other side; and a plurality (two pieces) of the metal openings 19 can be provided so as to correspond to the plurality (two pieces) of the adjacent regions 12a.

The metal opening 19 has a length in the range of, for example, 240 to 20000 µm, or preferably 750 to 10000 µm. The metal opening 19 has a width in the range of, for example, 40 to 5000 µm, or preferably 125 to 2000 µm.

In the suspension board with circuit 1, the excellent mechanical strength can be ensured by the metal supporting board 11 and the metal opening 19 in the metal supporting board 11 is provided so as to be continuous to the external-side terminal portions 17 that are adjacent to each other, so that the heat dissipation is ensured in the large adjacent region 12a and therefore, the burn can be prevented further reliably.

FIGS. 11 to 14 respectively show enlarged bottom views of essential parts of another embodiment (an embodiment in which the shape of the adjacent region is different) of the suspension board with circuit of the present invention.

In the above-described description, the adjacent region 12a is formed into a generally rectangular frame shape in plane view that is in contact with all the sides (four sides) of the outer circumference of the external-side terminal portion 17 in a generally rectangular shape in plane view and surrounds the external-side terminal portion 17 so as to be adjacent thereto. However, the shape of the adjacent region 12a is not limited to this. For example, as shown in FIG. 11, in the bottom view of the suspension board with circuit 1, the adjacent region 12a can be formed so as to be in contact with three sides of the outer circumference of the external-side terminal portion 17 in a generally rectangular shape in plane view. As shown in FIG. 12, in the bottom view of the suspension board with circuit 1, the adjacent region 12a can be formed so as to be in contact with two sides of the outer circumference of the external-side terminal portion 17 in a generally rectangular shape in plane view. As shown in FIG. 13, in the bottom view of the suspension board with circuit 1, the adjacent region 12a can be formed so as to be in contact with one side of the outer circumference of the external-side terminal portion 17 in a generally rectangular shape in plane view. In addition, as shown in FIG. 14, in the bottom view of the suspension board with circuit 1, the external-side terminal portion 17 can be divided into plural pieces (two pieces) by the adjacent region 12a.

FIGS. 15 to 19 respectively show enlarged bottom views of essential parts of another embodiment (an embodiment in which the shape of the external-side terminal portion is different) of the suspension board with circuit of the present invention.

In the above-described description, the external-side terminal portion 17 is formed into a generally rectangular shape in plane view and is disposed in the base opening 18 in the insulating base layer 12. However, the shape of the external-side terminal portion 17 is not limited to this. For example, as shown in FIG. 15, the external-side terminal portion 17 can be formed so as to protrude from the insulating base layer 12. As shown in FIG. 16, the external-side terminal portion 17 can be formed so that one end edge in the widthwise direction thereof is flush with the end edge (one end edge in the widthwise direction) of the insulating base layer 12. As shown in FIG. 17, a penetrating hole 27 in a circular shape in plane view can be formed in the external-side terminal portion 17. Also, as shown in FIG. 18, the penetrating hole 27 in a generally rectangular shape in plane view can be formed in the external-side terminal portion 17. In addition, as shown in FIG. 19, the external-side terminal portion 17 can be divided into plural pieces (two pieces) by forming the penetrating hole 27 in the external-side terminal portion 17.

The shape of the penetrating hole 27 shown in FIGS. 17 to 19 is a mere illustration and, though not shown, the penetrating hole 27 can be formed into various shapes such as a generally convex shape in plane view, a generally concave shape in plane view, or a generally X-shape in plane view.

Also, a known method can be appropriately used as a method for forming the external-side terminal portion 17 so as to protrude from the insulating base layer 12 and that for forming the penetrating hole 27 in the external-side terminal portion 17.

FIG. 20 shows a perspective view of an essential part of another embodiment (an embodiment in which a cut-out portion is formed in the external-side terminal portion) of the suspension board with circuit of the present invention.

In the above-described description, the external-side terminal portion 17 is formed into a generally rectangular shape in plane view and the penetrating hole 27 is formed as required. Alternatively, for example, as shown in FIG. 20, a cut-out portion 25 can be formed in the external-side terminal portion 17.

In the embodiment, the cut-out portion 25 is formed so that the solder ball 26 enters thereto. To be specific, the cut-out portion 25 is formed into a generally drop shape in plane view expanding from the rear end portion of the external-side terminal portion 17 toward the inner side and penetrates in the thickness direction (the laminating direction) of the external-side terminal portion 17.

In the embodiment, at the rear end portion of the wire portion 2, one end edge in the widthwise direction of the metal supporting board 11 is, when projected in the laminating direction, disposed so as to be overlapped with the other side end edge in the widthwise direction of the adjacent region 12a (one side end edge in the widthwise direction of the separated region 12b).

FIG. 21 shows an enlarged sectional view of an essential part of the suspension board with circuit and the external circuit board shown in FIG. 20. FIG. 22 shows an enlarged sectional view of an essential part showing a connecting state of the suspension board with circuit and the external circuit board shown in FIG. 21.

As referred in FIG. 2 (c), when the external-side terminal portion 17 of the suspension board with circuit 1 is electrically connected to the terminal portion of the external circuit board 31, which is shown in FIG. 20, the suspension board with circuit 1 and the external circuit board 31 can be disposed in parallel to be connected to each other. Alternatively, for example, as shown in FIGS. 21 and 22, the suspension board with circuit 1 and the external circuit board 31 can be disposed so as to be perpendicular to each other to be connected.

To be specific, in the embodiment, as shown in FIG. 21, the external circuit board 31 is first spaced in opposed relation to the suspension board with circuit 1 so that a planar surface including the suspension board with circuit 1 and that including the external circuit board 31 are perpendicular to each other. In this way, the external-side terminal portion 17 is spaced in opposed relation to the connecting terminal portion of the external circuit board 31.

The solder ball 26 is disposed on the top surface of the connecting terminal portion of the external circuit board 31 in advance.

Next, as shown in FIG. 22, the external circuit board 31 is allowed to come into contact with the suspension board with circuit 1 and the solder ball 26 is melted by a known method such as the laser light irradiation and the like.

In this way, the melted solder ball 26 is allowed to enter into the cut-out portion 25 in the external-side terminal portion 17, so that the external-side terminal portion 17 is electrically connected to the connecting terminal portion of the external circuit board 31.

In the suspension board with circuit 1, the melted solder ball 26 enters into the cut-out portion 25 in the external-side terminal portion 17, so that the melted solder ball 26 is fixed to the external-side terminal portion 17 further reliably and therefore, the terminal portion can be connected with the excellent reliability.

The shape of the cut-out portion 25 shown in FIGS. 20 to 22 is a mere illustration and, though not shown, the cut-out portion 25 can be formed into various shapes.

In each of the above-described description, the external-side terminal portion 17 is used as a terminal portion that is adjacent to the adjacent region 12a, in the projected surface when projected in the laminating direction. However, the terminal portion is not limited to this. For example, the head-side terminal portion 16 can be used and further, both of the external-side terminal portion 17 and the head-side terminal portion 16 can also be used.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

What is claimed is:

1. A suspension board with circuit comprising:
   an insulating base layer; and
   a conductive pattern that is laminated on a top surface of the insulating base layer, wherein the conductive pattern includes:
   a wire, and
   a terminal portion that is connected to the wire for being joined by a melted metal,
   wherein the insulating base layer, when viewing a sectional cut taken in a thickness direction which is perpendicular to a lengthwise direction and a widthwise direction of the suspension board with circuit, includes:
   a recess disposed in a bottom surface of the insulating base layer so as to form an adjacent region that is adjacent to the terminal portion, and
   a separated region that is separated from the terminal portion so as to sandwich the adjacent region between the terminal portion and the separated region,
   wherein the adjacent region is formed to be thinner than the separated region in the thickness direction, and
   wherein at least one lateral edge portion of the thinner adjacent region protrudes beyond an outermost lateral edge of the conductive pattern in the lengthwise direction of the suspension board with circuit.

2. The suspension board with circuit according to claim 1, wherein
   the suspension board with circuit further includes a metal supporting board that supports the insulating base layer and
   an opening is formed, at least in a portion corresponding to the adjacent region, in the metal supporting board.

3. The suspension board with circuit according to claim 1, wherein
   the suspension board with circuit further includes an insulating cover layer that covers the conductive pattern.

4. The suspension board with circuit according to claim 3, wherein
   an opening that exposes the terminal portion is formed in the insulating cover layer.

5. The suspension board with circuit according to claim 1, wherein
   the insulating base layer includes, on a back surface of the terminal portion, a thick layer portion that is thicker than the adjacent region, and
   a reinforcing layer is laminated on the back surface of the thick layer portion.

6. The suspension board with circuit according to claim 1, wherein,
   the conductive pattern includes a plurality of the terminal portions and
   the adjacent region is independently provided in each of a plurality of the terminal portions.

7. The suspension board with circuit according to claim 6, wherein,
   the opening in the metal supporting board is independently provided in the portion corresponding to the adjacent region.

8. The suspension board with circuit according to claim 1, wherein,
   the conductive pattern includes a plurality of the terminal portions and the adjacent region is provided so as to be continuous to the terminal portions that are adjacent to each other.

9. The suspension board with circuit according to claim 8, wherein,
   the opening in the metal supporting board is provided so as to be continuous in the portion corresponding to the adjacent region.

10. The suspension board with circuit according to claim 1, wherein,
    the terminal portion includes a cut-out portion into which the melted metal enters.

11. The suspension board with circuit according to claim 3, wherein the insulating cover layer is directly laminated on the thinner adjacent region of the insulating base layer.

* * * * *